US006104428A

United States Patent [19]
Lu et al.

[11] Patent Number: 6,104,428
[45] Date of Patent: *Aug. 15, 2000

[54] ADDRESSABLE VIDEO CAMERA FOR SECURITY MONITORING SYSTEM

[75] Inventors: Chung-Chien Lu, Hsinchu; Chien-Hung Hsu, Taipei Hsien; Alex Tang, Hsinchu, all of Taiwan

[73] Assignee: United Microelectronics Corp., Hsin-Chu, Taiwan

[*] Notice: This patent issued on a continued prosecution application filed under 37 CFR 1.53(d), and is subject to the twenty year patent term provisions of 35 U.S.C. 154(a)(2).

[21] Appl. No.: 09/073,640

[22] Filed: May 6, 1998

[30] Foreign Application Priority Data

Mar. 20, 1998 [TW] Taiwan ................... 87104158

[51] Int. Cl.$^7$ ....................................... H04N 7/18
[52] U.S. Cl. ................................. 348/159; 348/169
[58] Field of Search .................... 348/169, 143, 348/151, 152, 153, 159, 142, 213, 512, 154, 211, 360, 706; 455/349; 340/543, 506, 531

[56] References Cited

U.S. PATENT DOCUMENTS

| | | | |
|---|---|---|---|
| 4,511,886 | 4/1985 | Rodriguez | 348/143 |
| 4,700,230 | 10/1987 | Pshtissky et al. | 348/159 |
| 4,994,916 | 2/1991 | Pshtissky et al. | 348/159 |
| 5,164,827 | 11/1992 | Paff | 348/143 |
| 5,517,236 | 5/1996 | Sergeant et al. | 348/143 |
| 5,526,133 | 6/1996 | Paff | 348/159 |
| 5,745,167 | 4/1998 | Kageyu et al. | 348/159 |

*Primary Examiner*—Chris S. Kelley
*Assistant Examiner*—Gims Philippe
*Attorney, Agent, or Firm*—Thomas, Kayden, Horstemeyer & Risley

[57] ABSTRACT

An addressable video camera has an ability to be assigned an address, that allows a security monitoring system utilizing a plurality of such addressable video cameras to be connected to the security guard room via a single cable. The addressable video camera includes the following: a video imaging device for generating a video signal; an amplifier for amplifying the output video signal; a switch connected between the amplifier and the input/output port of the addressable video camera; an address setting unit for presetting an address value to the addressable video camera; a sync signal detector which is capable of generating a demodulation enable signal in response to the received video control signal; a demodulator for demodulating the address signal in the video control signal; and a microprocessor capable of comparing the demodulated address data with the preset address value. If these match, the switch is turned to the conducting state and the video-imaging device is switched to active operation. It then outputs the video signal. Since the signal transmission between the central control unit and the plurality of addressable video cameras can be carried out over one single cable, the arrangement and handling of the security monitoring system is considerably simplified.

10 Claims, 4 Drawing Sheets

ADDRESSABLE VIDEO CAMERA FOR SECURITY MONITORING SYSTEM

CROSS-REFERENCE TO RELATED APPLICATION

This application claims the priority benefit of Taiwan application serial no. 87104158, filed Mar. 20, 1998, the fall disclosure of which is incorporated herein by reference.

BACKGROUND OF THE INVENTION

1. Field of the Invention

This invention relates to security monitoring systems, and more particularly, to an addressable video camera to which an address can be assigned, for use on security monitoring systems.

2. Description of Related Art

Security monitoring systems are customarily installed in places such as banks for the purpose of allowing the security guards to visually observe remote sites for detection of potential criminal actions. Typically, a security monitoring system includes a number of video cameras that are connected via cables to a main monitor installed in the security guard room. By conventional technology, each of the video cameras is connected via a dedicated cable to the security guard room. Therefore, in case a great number of video cameras are installed, the total number of cables required to connected these video cameras to the security guard room will be correspondingly large. The handling and arrangement of such a great number of cables is undoubtedly a laborious and troublesome task. A conventional security monitoring system is illustratively depicted in the following with reference to FIG. 1.

FIG. 1 is a schematic block diagram showing the configuration of a conventional security monitoring system. As shown, the security monitoring system includes a main monitor 13, a switching circuit 11, and a plurality of video cameras connected respectively by a plurality of dedicated cables 15 to the switching circuit 11. In practical use, the switching circuit 11 and the main monitor 13 are installed, for example, in a security guard room 14, while the video cameras 12 are installed at those places that are to be under surveillance. Each of the video cameras 12 is installed at a particular place for the purpose of allowing the security guard in the security guard room 14 to visually observe that place for any possible criminal or unauthorized actions. The switching circuit 11 operates in a time-sharing multiplex manner that allows the video cameras 12 to be connected alternately to the main monitor 13. The captured video images from these video cameras 12 can be either alternately displayed on the main monitor 13, or displayed altogether at the same time in partitioned blocks on the screen of the main monitor 13. One drawback to this security monitoring system, however, is that each of the video cameras 12 is connected by one dedicated cable 15 to the security guard room 14. Each time one additional video camera is installed, it has to be connected by one additional cable to the security guard room 14. The total number of cables is therefore very large, which makes the handling and arrangement of the security monitoring system a very laborious and troublesome task. Moreover, in the event that the security guard room 14 is to be relocated to another site, the rearrangement of the cables would involve very laborious work.

SUMMARY OF THE INVENTION

It is therefore an objective of the present invention to provide an addressable video camera for use on a security monitoring system, which is specifically provided with an ability to be assigned an address that allows a security monitoring system utilizing a plurality of such addressable video cameras to be connected to the security guard room via a single cable. This allows a considerable simplification in the cabling of the security monitoring system and thus a considerable reduction in the installation cost.

In accordance with the foregoing and other objectives of the present invention, an addressable video camera is provided for use on a security monitoring system. The addressable video camera of the invention includes the following: a main monitor video imaging device for generating the video signal representing the captured video image; an amplifier for amplifying the output video signal from the video imaging device; a switch connecting the amplifier and the input/output port of the addressable video camera; an address setting means for presetting an address value to the addressable video camera; a sync signal detector, coupled to receive the externally generated first signal via the input/output port, capable of generating a demodulation enable signal in response to the video control signal; a demodulator, which is coupled to receive the externally generated video control signal via the input/output port and which is enabled by the demodulation enable signal from the sync signal detector, for demodulating the address signal; and a microprocessor capable of comparing the demodulated address data with the preset address value from the address setting means. If the demodulated address data and the preset address value from the address setting means match, the microprocessor outputs a first control signal to the switch to turn the switch to the conducting state and a second control signal to the video imaging device to switch the video imaging device into active operation to output the video signal.

BRIEF DESCRIPTION OF DRAWINGS

The invention can be more fully understood by reading the following detailed description of the preferred embodiments, with reference made to the accompanying drawings, wherein.

DETAILED DESCRIPTION OF PREFERRED EMBODIMENTS

Figure 1:
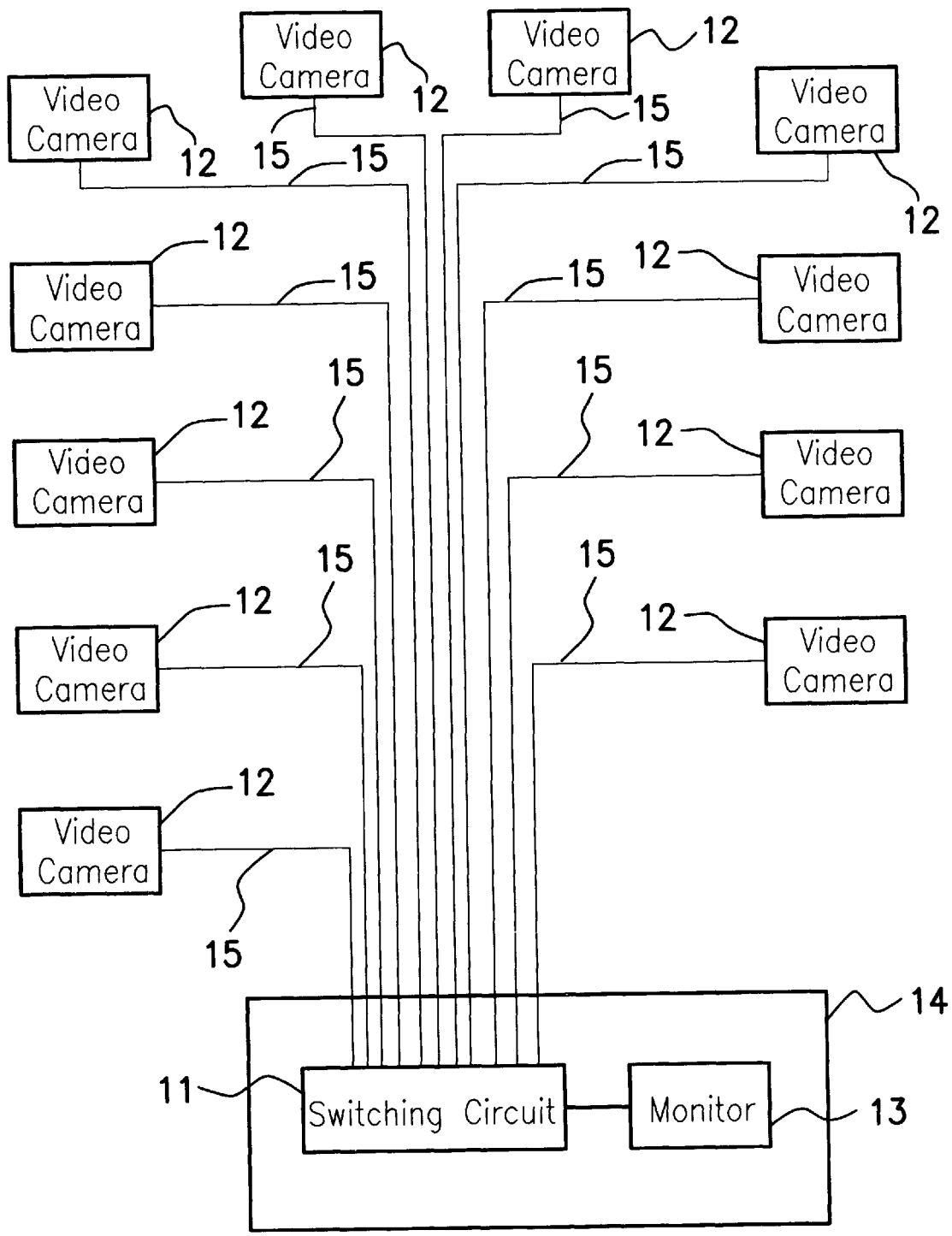
FIG. 1 is a schematic block diagram of a conventional security monitoring system.
Figure 2:
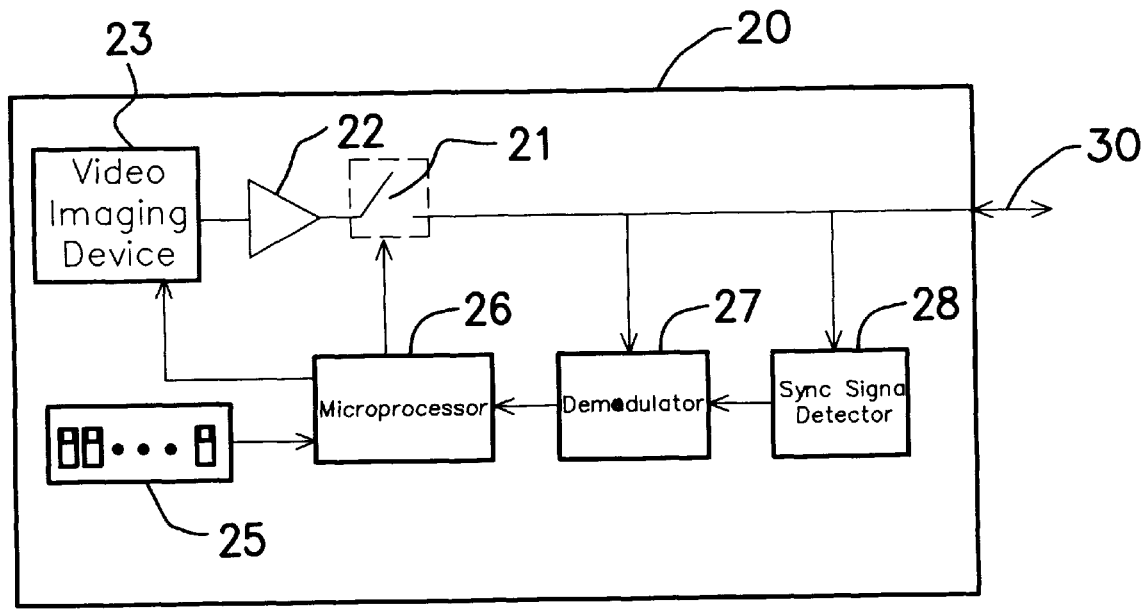
FIG. 2 is a schematic block diagram showing the inside structure of the addressable video camera of the invention.

FIG. 2 is a schematic block diagram showing the inside structure of the addressable video camera of the invention as indicated by the reference numeral 20. As shown, the addressable video camera 20 of the invention includes a switch 21, an amplifier 22, a video imaging device 23, an address setting means such as a jumper 25, a microprocessor 26, a demodulator 27, and a sync signal detector 28. Further, the addressable video camera 20 includes an input/output port 30 which can be connected to a cable (not shown) for connecting the addressable video camera 20 to a main monitor (not shown).

In accordance with the invention, the addressable video camera 20 operates in such a manner that it will activate the video imaging device 23 to send out the video signal to the input/output port 30 only when an externally generated address signal, which is imbedded in the video control signal, is received via the input/output port 30 and that the address signal is matched to the preset address value that was previously set by the jumper 25. In operation, the externally received video control signal from the input/output port 30 is checked by the sync signal detector 28 to see if it contains an address signal. If YES, the sync signal detector 28 outputs a demodulation enable signal to the demodulator 27, causing the demodulator 27 to perform a demodulation process on the address signal. The demodulated address data is then transferred to the microprocessor 26. The microprocessor 26 then compares the demodulated address data with the preset address value set by the jumper 25; if they match, the microprocessor 26 generates and transfers a first control signal to the switch 21 and a second control signal to the video imaging device 23, thus turning the switch 21 to the conducting state and activating the video imaging device 23. As a result, the video imaging device 23 starts to send out video signal which is amplified by the amplifier 22, transferred through the switch 21 to the input/output port 30, and subsequently transferred over a cable (not shown) connecting the input/output port 30 to a monitor (not shown) for viewing. The video imaging device 23 can be, for example, a CCD (charge coupled device) video camera.

The preset address value given by the jumper 25 can be any value selected by the user. However, when a plurality of such addressable video cameras are used in a security monitoring system, each of the addressable video cameras should be set to a unique address value so that each can be uniquely selected. The first control signal from the microprocessor 26 is sent out after the video imaging device 23 is started by the second control signal. The second control signal from the microprocessor 26 is a video sync initialization signal that allows the output video signal from the video imaging device 23 to be displayed with a continuous effect when being alternately switched.

Figure 3:
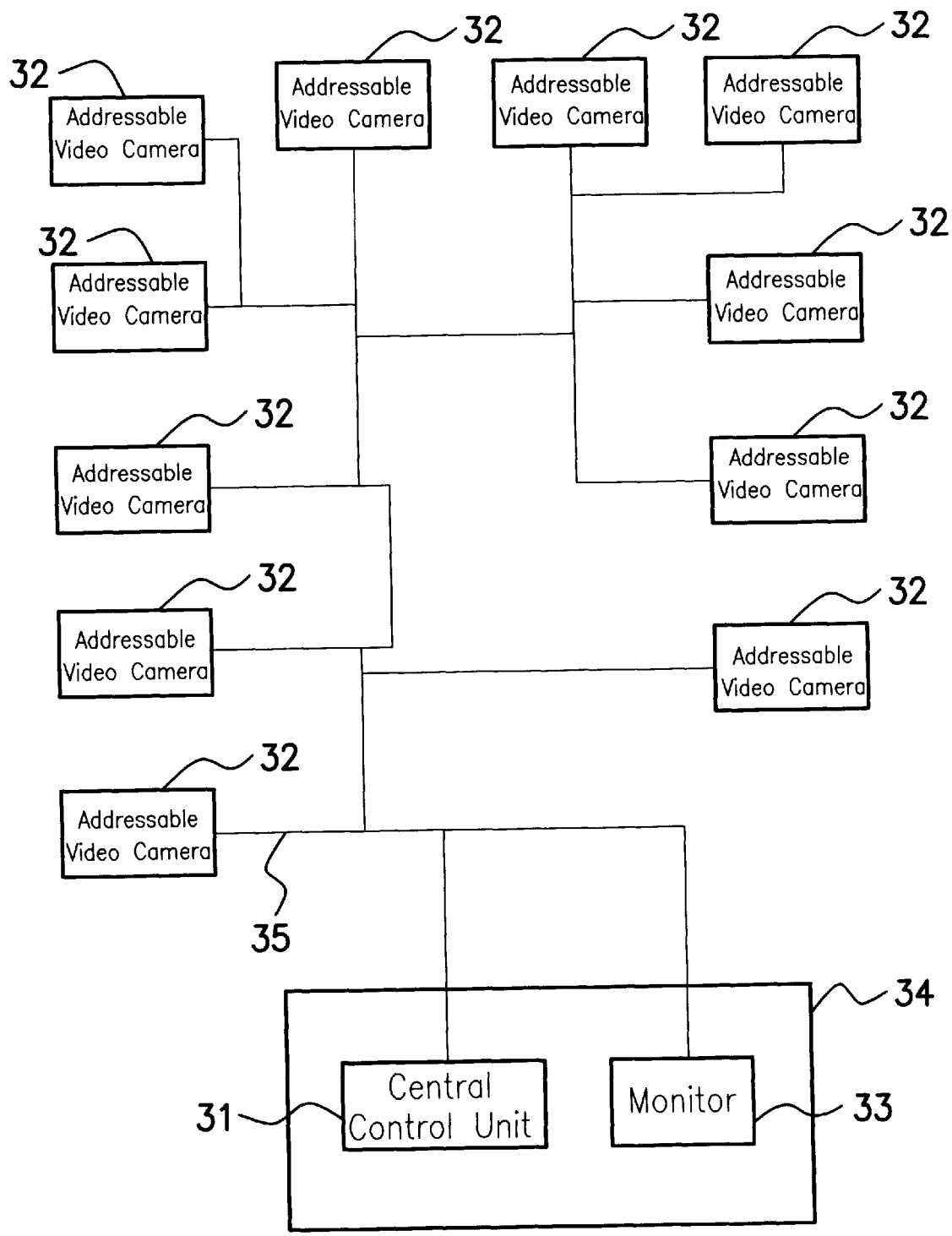
FIG. 3 is a schematic block diagram showing the configuration of a security monitoring system which utilizes the addressable video camera of the invention.

FIG. 3 is a schematic block diagram of a security monitoring system which utilizes the addressable video camera of the invention. As shown, the security monitoring system includes a central control unit 31, a main monitor 33, and a plurality of addressable video cameras (here designated instead by the reference numeral 32) which are connected via a cable 35 to both the central control unit 31 and the main monitor 33. In practical use, the central control unit 31 and the main monitor 33 are installed, for example, in a security guard room 34, while the addressable video cameras 32 are installed at those places that are to be under security monitoring. As mentioned earlier, each of the addressable video cameras 32 has a unique preset address value. In operation, when a particular one of the addressable video cameras 32 is to be switched into active operation, the central control unit 31 will send out the corresponding address signal via the cable 35 to all of the addressable video cameras 32; each then compares the received address signal with its preset address value. The matched one of the addressable video cameras 32 then switches into active operation, in a manner described above with reference to FIG. 2) and subsequently transmits the video signal of the captured video image via the cable 35 back to the central control unit 31 for display on the main monitor 33.

Figure 4A:
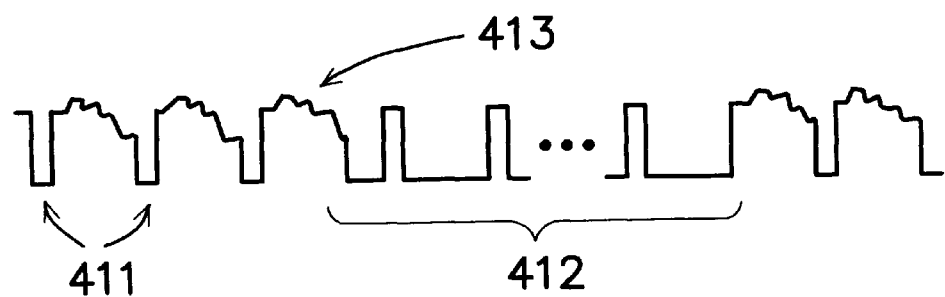
FIG. 4A is a waveform diagram showing the waveform format of a video control signal.

FIG. 4A is a waveform diagram showing the original waveform format of the video control signal when not imbedded with an address signal. As shown, the original waveform format of the video control signal includes a horizontal sync component 411 and a vertical sync component 412.

Figure 4B:
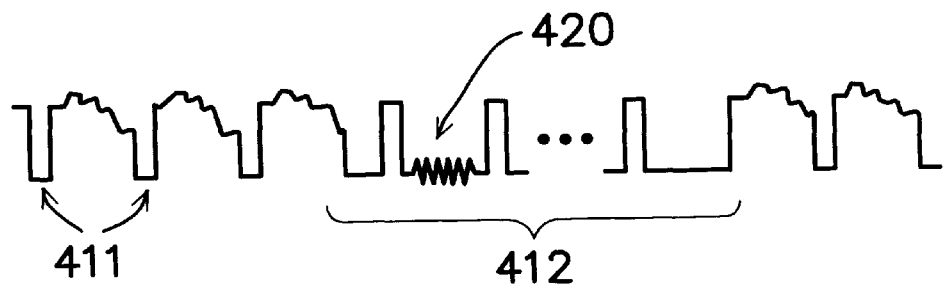
FIG. 4B is a waveform diagram showing the same of FIG. 4A except when being imbedded with an addressing signal in the vertical sync component.

Referring further to FIG. 4B, the address signal issued by the central control unit 31 (FIG. 3) is first modulated and then imbedded in the video control signal, as the part indicated by the reference numeral 420 in FIG. 4B. In the case of FIG. 4B, for example, the modulated address signal 420 is imbedded in the vertical sync component 412 of the video control signal. The video control signal, along with the imbedded address signal, is then transferred over the cable 35 to all of the addressable video cameras 32. Each of the addressable video cameras 32 then demodulates the received signal to extract the address data from the address signal 420 and then compares the address data with the prestored address value in a manner described above with reference to FIG. 2. The matched one of the addressable video cameras 32 will then switches into active operation.

Figure 5A:
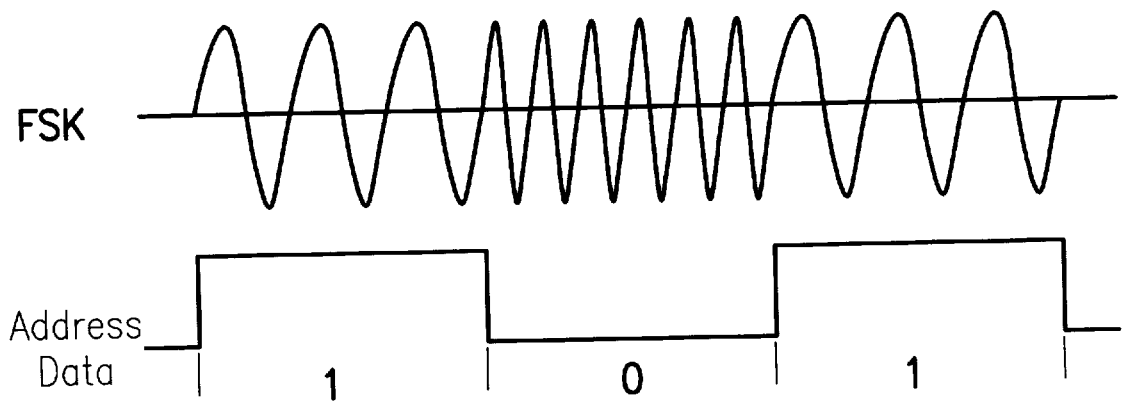
FIG. 5A is a waveform diagram showing the waveform of the modulated address signal when modulated by an FSK modulating method.
Figure 5B:
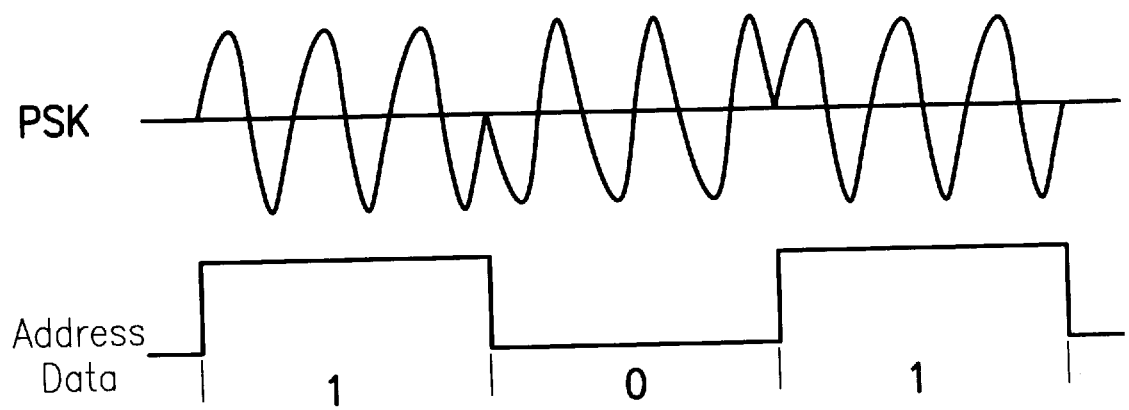
FIG. 5B is a waveform diagram showing the waveform of the modulated address signal when modulated by a PSK modulating method.
Figure 5C:
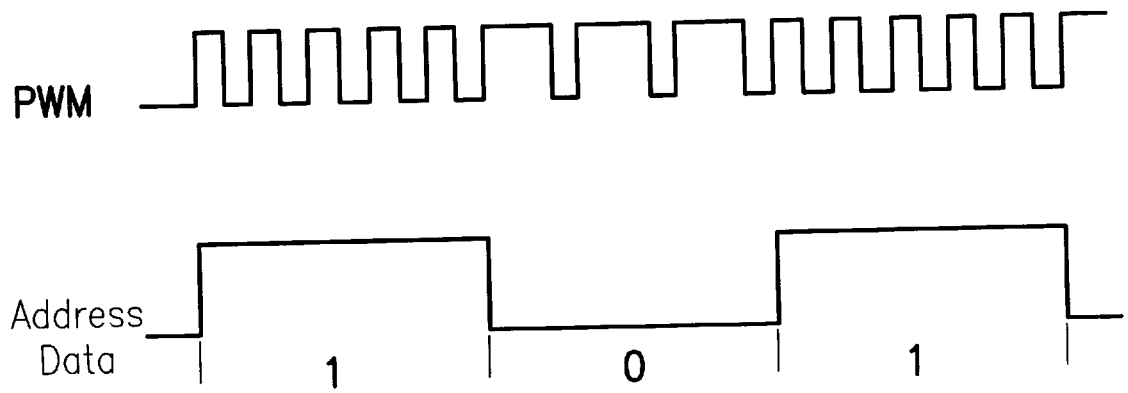
FIG. 5C is a waveform diagram showing the waveform of the modulated address signal when modulated by a PWM modulating method.

FIGS. 5A–5C show three examples of modulation methods that can be performed by a modulator (not shown) in the central control unit 31 to modulate the address signal. The modulated address signal is then imbedded into the vertical sync component of the video control signal.

FIG. 5A is a waveform diagram showing the waveform of the modulated address signal if an FSK (frequency shift keying) modulating method is used to modulate the address signal. As shown, the FSK modulated address signal varies between two frequencies respectively corresponding to the binary values 0 and 1 in the address data. The FSK modulated address signal is then imbedded into the vertical sync component of the video control signal. The FSK modulating method is a conventional and well-known modulating method in the field of communications, so details thereof will not be further described.

FIG. 5B is a waveform diagram showing the waveform of the modulated address signal if a PSK (phase shift keying) modulating method is used to modulate the address signal. As shown, the PSK modulated address signal changes its phase by 180° each time the current bit in the sequential stream of the address data is changed in value, whether from 1 to 0 or from 1 to 0. The PSK modulated address signal is then imbedded into the vertical sync component of the video control signal. The PSK modulating method is a conventional and well-known modulating method in the field of communications, so details thereof will not be further described.

FIG. 5C is a waveform diagram showing the waveform of the modulated address signal if a PWM (pulse width modulation) modulating signal is used to modulate the address signal. As shown, the PWM modulated address signal varies between two pulse widths respectively corresponding to the binary values 0 and 1 in the address data. The PWM modulated address signal is then imbedded into the vertical sync component of the video control signal. The PWM modulating method is a conventional and well-known modulating method in the field of communications, so details thereof will not be further described.

In conclusion, the invention is characterized in the provision of an addressable capability to the video cameras used in a security monitoring system, which allows all the video cameras to be connected via a single cable to the security guard room. Each of the addressable video cameras switches into active operation and sends out the video signal to the central control unit only when the received address data matches its preset address value. Since the signal transmission between the central control unit and the plurality of video cameras can be carried out over one single cable, the arrangement and handling of the security monitoring system is considerably simpler than that of prior art.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. An addressable video camera having an input/output port for receiving an externally generated first signal imbedded with a second signal, which comprises:

a video imaging device for generating a video signal representing a captured video image;

an amplifier for amplifying the output video signal from said video-imaging device;

a switch connected between said amplifier and the input/output port of said addressable video camera;

an address setting means for presetting an address value to said addressable video camera;

a sync signal detector, coupled to receive the externally generated first signal via the input/output port, capable of generating a demodulation enable signal in response to the first signal;

a demodulator, which is coupled to receive the externally generated first signal via the input/output port and which is enabled by the demodulation enable signal from said sync signal detector, for demodulating the first signal to extract the second signal from the first signal; and a microprocessor capable of comparing the second signal with the preset address value from said address setting means, wherein if a match is achieved, said microprocessor outputs a first control signal to said switch so as to turn said switch to the conducting state and a second control signal to said video imaging device so as to switch said video imaging device to active operation, where it outputs the video signal.

2. The addressable video camera of claim 1, wherein said video imaging device comprises a charge coupled device (CCD) module.

3. The addressable video camera of claim 1, wherein said first signal is a video control signal having a horizontal sync component and a vertical sync component, and said second signal is an address signal.

4. The addressable video camera of claim 3, wherein said address signal is imbedded in the vertical sync component of the video control signal.

5. The addressable video camera of claim 1, wherein said address setting means is a jumper.

6. The addressable video camera of claim 1, wherein the second signal is a frequency shift keying (FSK) modulated address signal, and said demodulator performs an FSK demodulating process to demodulate the address signal.

7. The addressable video camera of claim 1, wherein the second signal is a phase shift keying (PSK) modulated address signal, and said demodulator performs a PSK demodulating process to demodulate the address signal.

8. The addressable video camera of claim 1, wherein the second signal is a pulse width modulation (PWM) modulated address signal, and said demodulator performs a PWM demodulating process to demodulate the address signal.

9. The addressable video camera of claim 1, wherein said second control signal is a video sync initialization signal that allows the output video signal from said video imaging device to be displayed with a continuous effect when being alternately switched.

10. An image monitoring system, comprising:

a plurality addressable video cameras that are coupled together as desired onto a single cable to form a tree-like coupling structure with an optimized coupling length, wherein each of the addressable video cameras comprises:

an input/output port for receiving an externally generated first signal imbedded with a second signal;

a video imaging device for generating a video signal representing a captured video image;

an amplifier for amplifying the output video signal from said video-imaging device;

a switch connected between said amplifier and the input/output port of said addressable video camera;

an address setting means for presetting an address value to said addressable video camera;

a sync signal detector, coupled to receive the externally generated first signal via the input/output port, for generating a demodulation enable signal in response to the first signal;

a demodulator, which is coupled to receive the externally generated first signal via the input/output port and which is enabled by the demodulation enable signal from said sync signal detector, for demodulating the first signal to extract the second signal from the first signal; and a microprocessor capable of comparing the second signal with the preset address value from said address setting means, wherein if a match is achieved, said microprocessor outputs a first control signal to said switch so as to turn said switch to the conducting state and a second control signal to said video imaging device so as to switch said video imaging device to active operation, where it outputs the video signal; and a central image monitoring unit, which can send the first signal through the signal cable to said addressable video cameras and select one of said addressable video cameras for displaying images on said central image monitoring unit, wherein the selected one of said addressable video cameras recognizes that an address of the second signal imbedded in the first signal is matched to its individual preset address.

* * * * *